United States Patent [19]

Uchikawa et al.

[11] 4,154,803

[45] May 15, 1979

[54] METHOD OF DECREASING THE CONTENT OF NITROGEN OXIDES IN COMBUSTION EXHAUST GAS

[75] Inventors: Hiroshi Uchikawa, Funabashi; Haruhiko Komatsu, Tokyo, both of Japan

[73] Assignee: Onoda Cement Co., Ltd., Onoda, Japan

[21] Appl. No.: 781,187

[22] Filed: Mar. 25, 1977

[30] Foreign Application Priority Data

Mar. 31, 1976 [JP] Japan .................................. 51-34323

[51] Int. Cl.$^2$ ............................................. B01D 53/00
[52] U.S. Cl. ........................................................ 423/239
[58] Field of Search ................................. 423/239, 351

[56] References Cited

U.S. PATENT DOCUMENTS

| | | | |
|---|---|---|---|
| 2,381,696 | 8/1945 | Shapleigh | 423/239 |
| 3,459,494 | 8/1969 | Harris | 423/239 |
| 3,615,166 | 10/1971 | Hindin | 423/239 |
| 3,846,981 | 11/1974 | Paczkowski | 23/277 C |
| 3,900,554 | 8/1975 | Lyon | 423/235 |
| 4,080,218 | 3/1978 | Mori et al. | 106/100 |

OTHER PUBLICATIONS

Sidgwick, N. V.; "The Chemical Elements and Their Compounds;" Clarendon Press, Oxford, 1959, p. 658.

*Primary Examiner*—G. O. Peters
*Attorney, Agent, or Firm*—Frishauf, Holtz, Goodman & Woodward

[57] ABSTRACT

A method of decreasing the content of nitrogen oxides in a combustion exhaust gas which comprises the steps of mixing the combustion exhaust gas with at least one material selected from the group consisting of ammonia, an ammonium salt, urea and an aqueous solution thereof, and bringing the resulting mixture into contact at a temperature of 600° C. to 1,500° C. with any of the baked materials obtained during the process extending from preparation of cement blending materials to production of cement clinker by baking said cement blending materials, thereby decreasing the content of, for example, nitrogen monoxide (NO) in the combustion exhaust gas.

8 Claims, No Drawings

METHOD OF DECREASING THE CONTENT OF NITROGEN OXIDES IN COMBUSTION EXHAUST GAS

BACKGROUND OF THE INVENTION

This invention relates to a method of decreasing the content of nitrogen monoxide (NO) in a combustion exhaust gas by introducing ammonia thereinto.

Nitrogen oxides, generally represented by nitrogen monoxide (NO) and nitrogen dioxide ($NO_2$), are known as atmospheric contaminants. Various processes devised to date to meet urgent demands for elimination of such nitrogen oxides are broadly classified as those of a dry type and a wet type.

Most of the nitrogen oxides discharged into the atmosphere during the manufacture of cement are generated in a rotary kiln used for baking cement. Among various processes for removing the nitrogen oxides, a dry denitrogenization process, particularly an ammonia reduction process, is considered most hopeful in consideration of the fact that a cement baking furnace such as a rotary kiln gives forth a tremendous amount of exhaust gas which should be properly treated; temperature in the rotary kiln is found to be 800° C. to 1,100° C. at an inlet for cement raw materials on the so-called kiln bottom and at a relatively high level such as 1,150° C. to 1,500° C. at an outlet for baked clinker or the so-called kiln head; and the main component of the exhaust gas is nitrogen monoxide (NO). The above-mentioned ammonia reduction process is broadly classified into a catalytic type and a noncatalytic type.

Most of the various catalytic ammonia reduction processes proposed to date comprise the step of bringing ammonia into contact with catalytic beds at a temperature of 300° C. to 500° C. Where, however, any of the conventional catalytic ammonia reduction processes were applied in treating a combustion exhaust gas from a cement rotary kiln, the following difficulties occurred. The catalyst used decreased in activity due to the catalyst beds being plugged up with dust or the generation of sulfur oxides ($SO_x$). Where the exhaust gas was allowed to pass through an electric dust collector for removal of dust contained in the exhaust gas, the exhaust gas should be reheated. The gradual deterioration of the catalyst had also to be taken into account. It was necessary to provide a device for bringing the exhaust gas into contact with the catalyst.

The known noncatalytic ammonia reduction processes include those described in Japanese patent publications Nos. 23,664, 1970, and 35,908, 1975. The process of the first publication comprises the step of bringing exhaust gas from a cement baking furnace into contact with ammonia at high temperature with a heat-resistant barrier provided. With the process of said first publication, however, it is necessary to use ammonia in an amount of about 60 to 500-fold greater than that of the expected content of nitrogen monoxide in the exhaust gas, presenting problems from an economic standpoint.

The second publication discloses the step of mixing a combustion exhaust gas containing nitrogen monoxide with from 0.4 to 10 mols of ammonia per mol of the nitrogen monoxide at a temperature of 1,600° F. to 2,000° F. (871° C. to 1,093° C.) in the presence of a sufficient amount of oxygen and also the step of mixing the exhaust gas containing nitrogen monoxide with ammonia and a reducing agent at a temperature of 1,300° F. to 2,000° F. (704° C. to 1,093° C.).

However, the second publication shows that nitrogen monoxide is only slightly eliminated at a temperature lower than 1,600° F. (871° C.) and higher than 2,000° F. (1,093° C.), and further suggests that since nitrogen monoxide is produced at a temperature higher than 2,000° F. (1,093° C.), the content of the nitrogen monoxide of the exhaust gas increases conversely with the occurrence of an undesirable event.

SUMMARY OF THE INVENTION

This invention has been accomplished in view of the above-mentioned circumstances and is intended to provide a method of decreasing an amount of nitrogen monoxide contained in a combustion exhaust gas evolved during the baking of cement.

This invention provides a method of decreasing the content of nitrogen monoxide of said combustion exhaust gas which comprises the steps of mixing the combustion exhaust gas with at least one material selected from the group consisting of ammonia, an ammonium salt, urea and an aqueous solution thereof; and bringing the mixture into contact at a temperature of 600° C. to 1,500° C. with any of the baked materials obtained during a process extending from preparation of cement blending materials to production of cement clinker by baking said cement blending materials, thereby decreasing the content of nitrogen monoxide in the combustion exhaust gas.

DETAILED DESCRIPTION OF THE INVENTION

We have conducted studies in a search for a material capable of promoting the reduction of nitrogen monoxide by ammonia and have discovered that where a mixture of a combustion exhaust gas containing nitrogen monoxide and at least one material selected from the group consisting of ammonia, an ammonium salt, urea and an aqueous solution thereof is brought into contact with any of the baked materials obtained during a process extending from preparation of cement blending materials to production of cement clinker by baking said cement blending materials at a temperature of 600° C. to 1,500° C., preferably 800° C. to 1,500° C., or more preferably 1,000° C. to 1,500° C., then the reduction of nitrogen monoxide by ammonia is prominently accelerated over a broad temperature range.

In this invention, ammonia may be introduced into a combustion exhaust gas in the form of a gas or an aqueous solution. Further, it is also impossible to use ammonium formate, ammonium oxalate, ammonium carbonate and urea which evolve ammonia through decomposition when heated to a high temperature. Further, these compounds may be applied in the form of a powder or an aqueous solution. Ammonia or an above-mentioned ammonia-evolving salt is added at the rate of from 0.3 to 7 mols, preferably 0.5 to 3 mols, as converted to ammonia, per mol of nitrogen monoxide contained in the combustion exhaust gas. Where addition of ammonia or an ammonium salt falls below 0.3 mol per mol of nitrogen oxide, then the effect of elimination of nitrogen monoxide decreases. Conversely, addition of an amount of ammonia or an ammonium salt larger than 7 mols per mol of nitrogen oxide produces only a small increase in removing nitrogen monoxide. In the latter case, the exhaust of unreacted ammonia will be undesirably increased.

Cement blending materials used with this invention include those customarily applied in the making of cement such as ordinary portland cement, white portland cement, alumina cement, regulated set (jet) cement, and barium cement. In the manufacture of cement, the above-listed blending materials are sintered into cement clinker. Intermediate mineral products (including clinker) thermally generated during the baking process act very effectively in the case of this invention.

The method of the invention proves most useful in treating nitrogen monoxide-carrying exhaust gas evolved during the baking of cement. The baking of cement gives forth tremendous volumes of hot combustion gas, and consequently hot exhaust gas containing a large amount of dust which has to be treated. With the method of the invention, ammonia has only to be introduced into the combustion gas at the inlet of cement blending materials, namely, the so-called kiln bottom, or, with the Suspension Preheater system or New Suspension Preheater system, into the cyclones of the respective stages or at the outlet for baked clinker, namely, into the kiln head portion receiving, for example, primary and secondary burner air coolers and mantle. A cement baking rotary kiln contains streams of active cement blending materials and clinker including intermediate mineral products and dusts thereof. Therefore, ammonia entering the rotary kiln is brought into full contact with these active materials, providing suitable conditions for reduction of nitrogen monoxide contained in gas streams flowing through the rotary kiln. Accordingly, the method of this invention completely eliminates the necessity of considering the occurrence of difficulties such as the deterioration of catalytic activity often observed with the fixed form of catalyst, and can efficiently and economically decrease the concentration of nitrogen monoxide in a combustion exhaust gas produced in a cement baking furnace.

Application of the method of this invention is not limited to the removal of nitrogen oxides contained in a combustion exhaust gas from a cement making plant. But the method can be effectively used to decrease the content of nitrogen oxides in combustion gases present in a boiler or any other combustion device by filling or retaining cement blending materials crushed into powders or proper particles in the form of fluidized beds or baked beds or causing said crushed materials to be suspended in an exhaust gas.

In the method of this invention, baked products obtained during a process extending from preparation of cement blending materials to production of cement clinker display a prominent effect of reducing nitrogen monoxide when contacted with ammonia. This appears to be due to catalytic activity exhibited by the baked materials. Further, intermediate products (including cement clinker) generated during the baking of cement remain in an unstable condition from the chemical, physical and mineralogical point of view, which is assumed to assist in increasing the above-mentioned catalytic activity.

As shown in the following examples using cement blending materials and chamotte brick, respectively, the chamotte brick affects little removal of nitrogen monoxide at a temperature lower than 1,500° C. In contrast, cement blending materials used in the method of this invention display a noticeable effect on the elimination of nitrogen monoxide, clearly proving that said cement blending materials have a catalytic action.

This invention will be more fully understood by reference to the examples which follow. Throughout the examples, tests were conducted by heating a porcelain tube packed with a powdered sample to different temperatures, introducing a mixture of a nitrogen monoxide-carrying gas and ammonia into the packed porcelain tube and determining the rate of nitrogen monoxide removal from changes in the amount thereof occurring at the inlet and outlet of the porcelain tube by means of an instrument measuring said changes in the nitrogen monoxide content.

EXAMPLE 1

To examine the catalytic effect of cement blending materials and other sample materials on the removal of nitrogen monoxide, there was prepared a gaseous mixture consisting of 75.7% nitrogen, 4.2% air (or oxygen), 20% carbon dioxide, 960 ppm nitrogen oxide standard gas formed of $N_2+NO$ (2,000 ppm) and 2,000 ppm ammonia standard gas formed of $N_2+NH_3$ (10,000 ppm). Tests were made of the effect of cement blending materials and other sample materials at different temperatures, the results being set forth in Table 1, below.

Table 1

| Sample No. | Packed material* | Temperature (° C.) | | | | | | | | | | |
|---|---|---|---|---|---|---|---|---|---|---|---|---|
| | | 500 | 600 | 700 | 800 | 900 | 1000 | 1100 | 1200 | 1300 | 1400 | 1500 |
| 1 | When not packed | 0 | 0 | 1 | 8 | 75 | 89 | 90 | 51 | 48 | 45 | 41 |
| 2 | Blending materials of ordinary portland cement | 5 | 65 | 75 | 80 | 84 | 97 | 97 | 95 | 98 | 92 | 90 |
| 3 | Heat-treated blending materials** of ordinary portland cement | 5 | 67 | 81 | 83 | 88 | 97 | 98 | 95 | 97 | 93 | 95 |
| 4 | Ordinary portland cement clinker | 3 | 58 | 72 | 77 | 83 | 98 | 97 | 96 | 96 | 92 | 92 |
| 5 | Blending materials of white portland cement | 5 | 65 | 77 | 80 | 85 | 92 | 93 | 93 | 93 | 91 | 85 |
| 6 | Blending materials of regulated*** set (jet) | 8 | 70 | 77 | 78 | 82 | 89 | 91 | 90 | 92 | 88 | 83 |
| 7 | Blending material of alumina cement | 2 | 60 | 73 | 79 | 83 | 87 | 90 | 94 | 93 | 91 | 88 |
| 8 | Blending materials of Barium**** cement | 3 | 57 | 65 | 83 | 85 | 88 | 92 | 89 | 90 | 87 | 81 |
| 9 | Chamotte brick | 0 | 0 | 0 | 10 | 72 | 88 | 91 | 45 | 41 | 40 | 48 |

*The packed materials were crushed to particles sizes of 590 to 88 microns. The packed materials were laid to a thickness of 5 cm. The space velocity of the packed materials in the porcelain tube was set at about 2,450 h$^{-1}$ at 800° C.
**Cement blending materials were heat treated by being kept at a temperature of 1,000° C. for one hour.
***The blending materials of regulated set (jet) cement are baked to provide clinker mainly consisting of minerals $11CaO.7Al_2O_3$. $CaF_2$ and $3CaO.SiO_2$.
****The blending materials of barium cement are baked to provide clinker mainly consisting of $2BaO.SiO_2$ and $4BaO.Al_2O_3$. $Fe_2O_3$.

Table 1 shows that the cement blending materials of Sample Nos. 2 to 4 display a prominent catalytic effect of eliminating nitrogen monoxide over a very broad temperature range as compared with the case where said blending materials are not packed. This catalytic effect begins to become noticeable at a temperature of about 600° C., increases with temperature and proves extremely prominent at a temperature higher than 1,000° C. Chamotte brick of Sample No. 5 indicates little difference in its removing nitrogen monoxide when packed and when not packed.

Further tests were made by replacing ammonia with ammonium formate, ammonium oxalate, ammonium carbonate and urea. These compounds were added in such amounts as to cause 2,000 ppm of ammonia to be produced when thermally decomposed. The tests produced substantially the same results as shown in Table 1, above.

EXAMPLE 2

The content of the nitrogen monoxide standard gas and that of the ammonia standard gas in the gaseous mixture used in Example 1 were controlled to examine the relationship between the ratio of the amount of ammonia to that of nitrogen monoxide and the rate of removing the nitrogen monoxide, in order to determine an optimum amount of ammonia to be added. The results are set forth in Table 2, below.

Table 2

| Packed material* | Concentration between passing through the packed material (vol. ppm) | | NH$_3$/No (mol ratio) | Ratio of NO removal (%) | | Percent of NH$_3$ residue (850° C.) |
|---|---|---|---|---|---|---|
| | NO | NH$_3$ | | 850° C. | 1,250° C. | |
| Blending materials of ordinary portland cement | 1,170 | 250 | 0.21 | 25 | 25 | 0 |
| | 1,155 | 375 | 0.32 | 40 | 45 | 0 |
| | 1,140 | 500 | 0.44 | 47 | 51 | 0 |
| | 1,080 | 1,000 | 1.08 | 80 | 90 | 0 |
| | 840 | 3,000 | 3.57 | 85 | 97 | 2.0 |
| | 545 | 4,300 | 7.89 | 89 | 96 | 21.5 |
| Clinker of ordinary portland cement | 1,170 | 250 | 0.21 | 28 | 26 | 0 |
| | 1,155 | 375 | 0.32 | 40 | 42 | 0 |
| | 1,140 | 500 | 0.44 | 45 | 53 | 0 |
| | 1,080 | 1,000 | 1.08 | 75 | 89 | 0 |
| | 840 | 3,000 | 3.57 | 80 | 95 | 2.7 |
| | 545 | 4,300 | 7.89 | 88 | 95 | 23.1 |

*The packed materials had the same particle size, layer thickness and space velocity as in Example 1.

Table 2 shows that where ammonia was added in such an amount as to cause the ratio of NH$_3$/NO to be greater than 0.5, more than half of the NO content was removed, and where the ratio of NH$_3$/NO was greater than 1, nitrogen monoxide was removed quite satisfactorily.

EXAMPLE 3

Tests were made of the effect of the oxygen concentration in a combustion exhaust gas from a cement baking furnace to be treated by the method of this invention for the removal of nitrogen monoxide contained therein. Tests were conducted to determine the effect on said removal of the oxygen concentration in the gaseous mixture used in Example 1 which contained nitrogen oxides with the air content thereof controlled to vary the oxygen content. The results are indicated in Table 3, below.

Table 3

| Packed* material | Concentration before passed through the packed material | | Rate of removal | |
|---|---|---|---|---|
| | NO (Vol. ppm) | O$_2$ (Vol. %) | 850° C. | 1,250° C. |
| Blending materials | 1,280 | 0 | 73 | 78 |
| | 1,120 | 2.1 | 85 | 98 |
| of cement | 960 | 4.2 | 85 | 98 |
| | 933 | 7.0 | 81 | 93 |
| Cement clinker | 1,280 | 0 | 70 | 75 |
| | 1,120 | 2.1 | 80 | 95 |
| | 960 | 4.2 | 83 | 97 |
| | 933 | 7.0 | 75 | 89 |

Note 1.
*The packed materials had the same particle size, layer thickness and space velocity as in Example 1.
Note 2.
The concentration of ammonia of a gaseous mixture just before introduction into the porcelain tube was controlled to 2,000 ppm.

Table 3 shows that the concentration of oxygen in a combustion exhaust gas from a cement baking furnace exerts no harmful effect on the removal of nitrogen monoxide by ammonia.

We claim:

1. A method of decreasing the nitrogen oxide content of a combustion exhaust gas which comprises the steps of forming a mixture consisting essentially of a combustion exhaust gas and at least one material selected from the group consisting of ammonia, an ammonium salt, urea and an aqueous solution thereof, and contacting the mixture with a catalyst consisting essentially of at least one cement clinker heated at a temperature of 600° C. to 1500° C., thereby decreasing the nitrogen monoxide content of the exhaust gas, said ammonia, ammonium salt, urea or aqueous solution thereof being mixed with the combustion exhaust gas at a rate of from 0.3 to 7 mols as converted to ammonia per mol of nitrogen monoxide contained in the combustion exhaust gas, and said cement clinker being selected from the group consisting of ordinary portland cement clinker, white portland cement clinker, alumina portland cement clinker, regulated set cement clinker and barium cement clinker.

2. The method of decreasing the nitrogen oxide content of a combustion exhaust gas according to claim 1, wherein the ammonium salt is selected from the group consisting of ammonium formate, ammonium oxalate, and ammonium carbonate.

3. The method of decreasing the nitrogen oxide content of a combustion exhaust gas according to claim 1, wherein the cement clinker is obtained by baking blending materials for the production of ordinary portland cement clinker.

4. The method of decreasing the nitrogen oxide content of a combustion exhaust gas according to claim 1, wherein the cement clinker is ordinary portland cement clinker.

5. The method of decreasing the nitrogen oxide content of a combustion exhaust gas according to claim 1, wherein the cement clinker is obtained by baking blending materials for the production of white portland cement clinker.

6. The method of decreasing the nitrogen oxide content of a combustion exhaust gas according to claim 1, wherein the cement clinker is obtained by baking blending materials for the production of regulated set cement clinker.

7. The method of decreasing the nitrogen oxide content of a combustion exhaust gas according to claim 1, wherein the cement clinker is obtained by baking blending materials for the production of alumina cement clinker.

8. The method of decreasing the nitrogen oxide content of a combustion exhaust gas according to claim 1, wherein the cement clinker is obtained by baking blending materials for the production of barium cement clinker.

* * * * *